(12) United States Patent
Bahr

(10) Patent No.: US 8,675,645 B2
(45) Date of Patent: Mar. 18, 2014

(54) METHOD FOR OPERATING A WIRELESS MESH DATA NETWORK WITH MULTIPLE NODES

(75) Inventor: Michael Bahr, München (DE)

(73) Assignee: Siemens AG, Munich (DE)

( * ) Notice: Subject to any disclaimer, the term of this patent is extended or adjusted under 35 U.S.C. 154(b) by 731 days.

(21) Appl. No.: 12/666,247

(22) PCT Filed: Jun. 6, 2008

(86) PCT No.: PCT/EP2008/057057
§ 371 (c)(1),
(2), (4) Date: Dec. 22, 2009

(87) PCT Pub. No.: WO2009/000630
PCT Pub. Date: Dec. 31, 2008

(65) Prior Publication Data
US 2010/0177753 A1  Jul. 15, 2010

(30) Foreign Application Priority Data

Jun. 25, 2007  (DE) .................. 10 2007 029 120

(51) Int. Cl.
*H04L 12/50*  (2006.01)
(52) U.S. Cl.
USPC .......... 370/380; 370/241; 370/242; 370/243; 370/244; 370/245; 370/249; 370/351; 370/325; 370/355; 370/357; 370/386; 370/389; 370/392; 370/396; 370/395.3; 370/395.31; 370/395.32; 370/395.54; 370/400; 370/408; 370/431; 370/432
(58) Field of Classification Search
None
See application file for complete search history.

(56) References Cited

U.S. PATENT DOCUMENTS

| 6,535,498 B1 * | 3/2003 | Larsson et al. ............. 370/338 |
| 7,457,304 B2 * | 11/2008 | Roh et al. ................. 370/406 |
| 7,693,146 B2 * | 4/2010 | Subramanian ............. 370/390 |

(Continued)

FOREIGN PATENT DOCUMENTS

| JP | 2002-281042 | 9/2002 |
| JP | 2003-087169 | 3/2003 |

OTHER PUBLICATIONS

Distributed Cached Updating for the Dynamic Source Routing Protocol, Yu, Xin, IEEE Transactions on Mobile Computing, vol. 5, No. 6, Jun. 2006.*

(Continued)

*Primary Examiner* — Hassan Phillips
*Assistant Examiner* — Gautam Sharma
(74) *Attorney, Agent, or Firm* — Cozen O'Connor

(57) ABSTRACT

A method for operating a wireless mesh data network with multiple nodes, wherein data frames are transmitted from a source node via one or more intermediate nodes to a destination node, wherein the source node, the one or more intermediate nodes, and the destination node constitute network nodes of the data network, wherein during transmission of a data frame, at least some of the network nodes which receive the data frame, using a precursor list for the destination nodes which is assigned to the destination nodes of the data frame, check whether the network node sending the data frame is in the precursor list, and wherein in the case of a positive result, the data frame is transmitted to a further network node, and in the case of a negative result, the data frame is thrown out or processed by an error recovery routine.

19 Claims, 19 Drawing Sheets

(56) References Cited

U.S. PATENT DOCUMENTS

| | | | | |
|---|---|---|---|---|
| 7,787,424 B2* | 8/2010 | Kang et al. | | 370/338 |
| 8,064,416 B2* | 11/2011 | Liu | | 370/338 |
| 2002/0019875 A1* | 2/2002 | Garrett et al. | | 709/230 |
| 2002/0036987 A1* | 3/2002 | Garcia-Luna-Aceves et al. | | 370/238 |
| 2002/0039357 A1* | 4/2002 | Lipasti et al. | | 370/338 |
| 2002/0080755 A1* | 6/2002 | Tasman et al. | | 370/338 |
| 2004/0233855 A1* | 11/2004 | Gutierrez et al. | | 370/252 |
| 2005/0041627 A1* | 2/2005 | Duggi | | 370/338 |
| 2005/0083952 A1* | 4/2005 | Swain | | 370/401 |
| 2006/0098608 A1* | 5/2006 | Joshi | | 370/338 |
| 2008/0002599 A1* | 1/2008 | Yau et al. | | 370/310 |
| 2008/0062916 A1* | 3/2008 | Mosko et al. | | 370/328 |
| 2008/0117823 A1* | 5/2008 | Krishnakumar et al. | | 370/236 |
| 2008/0170518 A1* | 7/2008 | Duggi et al. | | 370/310 |
| 2008/0310340 A1* | 12/2008 | Isozu | | 370/328 |
| 2008/0316951 A1* | 12/2008 | Zeng et al. | | 370/312 |

OTHER PUBLICATIONS

Perkins et al., "RFC 3561: Ad hoc On-Demand Distance Vector (AODV) Routing", Network Working Group, RFC 3561, Jul. 2003, US; URL http://www.ietf,org/rfc/rfc3561.txt; Others (40 pgs).

IEEE 802.11s D1.01; IEEE 802.11s D1.01; IEEE 802.11s D1.01; Others (12 pgs.), Mar. 2007.

Garcia-Luna-Aceves J. J. et al., "On-Demand Loop-Free Routing With Link Vectors" IEEE Journal on Selected Areas in Communications, IEEE Service Center, Piscataway, US Bd. 23, Nr. 3, Mar. 1, 2005, Seiten 533-546, XP 011127690 ISSN: 0733-8716 Chapters I and II; Others (pp. 533-546).

Panagiotis Papadimitratos et al.: "How to Specify and How to Prove Correctness of Secure Routing Protocols for MANET" Broadband Communications, Networks and System, 2006. Broadnets 2006. $3^{rd}$ International Conference on, IEEE, PI, Oct. 1, 2006, Seiten 1-10, XP031155895 ISBN: 978-1-4244-0424-7 Chapter 4, Appendix A; Others (10 pgs.).

* cited by examiner

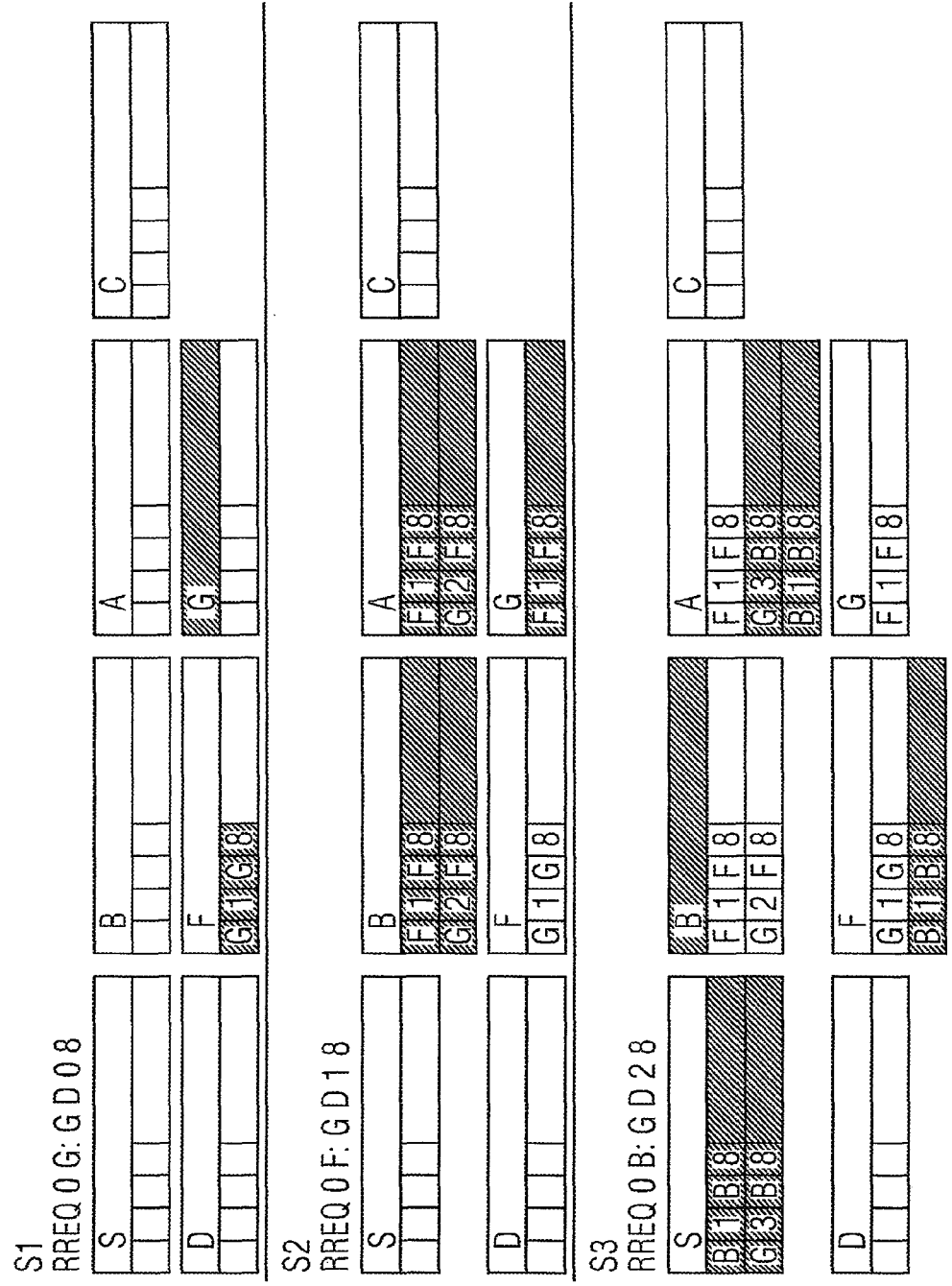

FIG 3B

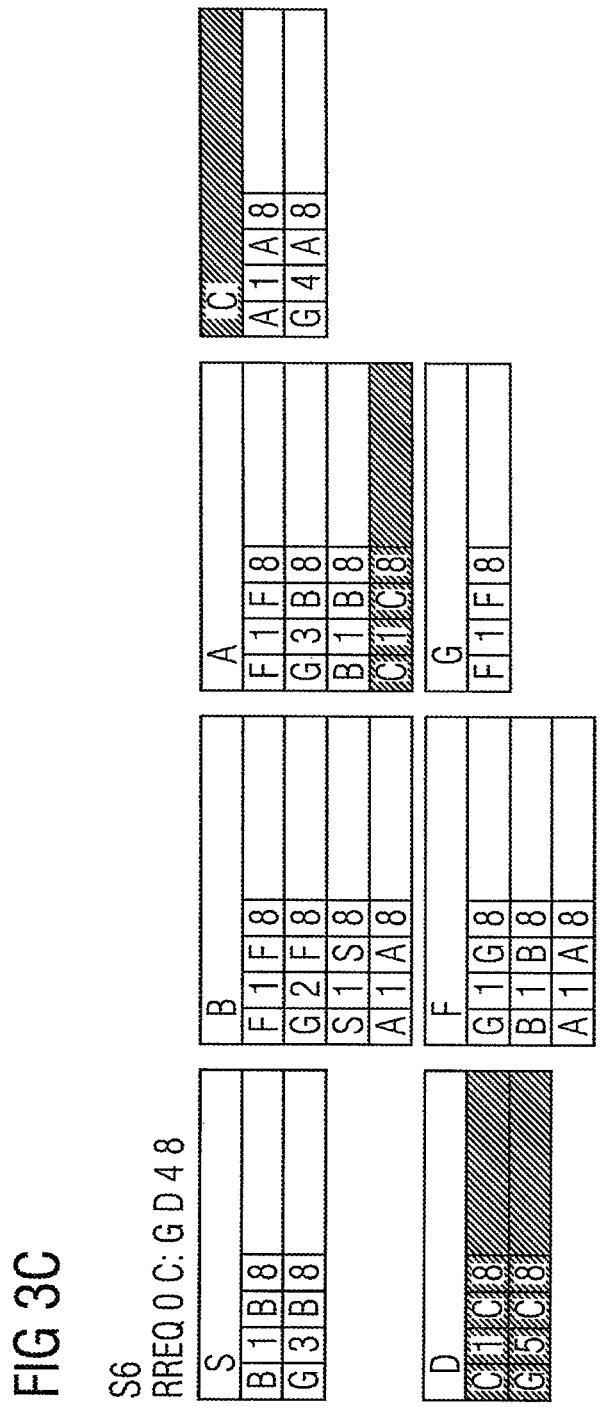

FIG 4

| FIG 4A |
|---|
| FIG 4B |
| FIG 4C |

FIG 4A

S7
RREP 0 D → C : G D 0 8

| S | | |
|---|---|---|
| B | 1 | B | 8 |
| G | 3 | B | 8 |

| D | | |
|---|---|---|
| C | 1 | C | 8 |
| G | 5 | C | 8 |

| B | | |
|---|---|---|
| F | 1 | F | 8 |
| G | 2 | F | 8 |
| S | 1 | S | 8 |
| A | 1 | A | 8 |

| F | | |
|---|---|---|
| G | 1 | G | 8 |
| B | 1 | B | 8 |
| A | 1 | A | 8 |

| A | | |
|---|---|---|
| F | 1 | F | 8 |
| G | 3 | B | 8 |
| B | 1 | B | 8 |
| C | 1 | C | 8 |

| G | | |
|---|---|---|
| F | 1 | F | 8 |

| C | | |
|---|---|---|
| A | 1 | A | 8 |
| G | 4 | A | 8 | (D,8) |
| D | 1 | D | 8 | (A,8) |

S8
RREP 0 C → A : G D 1 8

| S | | |
|---|---|---|
| B | 1 | B | 8 |
| G | 3 | B | 8 |

| D | | |
|---|---|---|
| C | 1 | C | 8 |
| G | 5 | C | 8 |

| B | | |
|---|---|---|
| F | 1 | F | 8 |
| G | 2 | F | 8 |
| S | 1 | S | 8 |
| A | 1 | A | 8 |

| F | | |
|---|---|---|
| G | 1 | G | 8 |
| B | 1 | B | 8 |
| A | 1 | A | 8 |

| A | | |
|---|---|---|
| F | 1 | F | 8 |
| G | 3 | B | 8 | (C,8) |
| B | 1 | B | 8 |
| C | 1 | C | 8 |
| D | 2 | C | 8 | (B,8) |

| G | | |
|---|---|---|
| F | 1 | F | 8 |

| C | | |
|---|---|---|
| A | 1 | A | 8 |
| G | 4 | A | 8 | (D,8) |
| D | 1 | D | 8 | (A,8) |

S11
RREP OF →G : G D 4 8

| S | | |
|---|---|---|
| B 1 | B 8 | |
| G 3 | B 8 | |

| D | | |
|---|---|---|
| C 1 | C 8 | |
| G 5 | C 8 | |

| B | | |
|---|---|---|
| F 1 | F 8 | |
| G 2 | F 8 | (A,8) |
| S 1 | S 8 | |
| A 1 | A 8 | |
| D 3 | A 8 | (F,8) |

| F | | |
|---|---|---|
| ///// | ///// | (B,8) |
| G 1 | G 8 | |
| B 1 | B 8 | |
| A 1 | A 8 | |
| D 4 | B 8 | (G,8) |

| A | | |
|---|---|---|
| F 1 | F 8 | |
| G 3 | B 8 | |
| B 1 | B 8 | |
| C 1 | C 8 | (C,8) |
| D 2 | C 8 | (B,8) |

| G | | |
|---|---|---|
| F 1 | F 8 | |
| D 5 | F 8 | ///// |

| C | | |
|---|---|---|
| A 1 | A 8 | |
| G 4 | A 8 | (D,8) |
| D 1 | D 8 | (A,8) |

FIG 5

| FIG 5A |
|--------|
| FIG 5B |
| FIG 5C |
| FIG 5D |

FIG 5A

S12
RREQ 3 S:SD 0 8

| S |
|---|
| B 1 B 8 |
| G 3 B 8 |

| B | | |
|---|---|---|
| F 1 F 8 | | |
| G 2 F 8 | | |
| S 1 S 11 | | |
| A 1 A 8 | (A,8) | |
| D 3 A 8 | (F,8) | |

| A | | |
|---|---|---|
| F 1 F 8 | | |
| G 3 B 8 | | |
| B 1 B 8 | (C,8) | |
| C 1 C 8 | | |
| D 2 C 8 | (B,8) | |

| C | |
|---|---|
| A 1 A 8 | |
| G 4 A 8 | |
| D 1 D 8 | (D,8) |
| | (A,8) |

| F | |
|---|---|
| G 1 G 8 | (B,8) |
| B 1 B 8 | |
| A 1 A 8 | |
| D 4 B 8 | (G,8) |

| G |
|---|
| F 1 F 8 |
| D 5 F 8 |

| D |
|---|
| C 1 C 8 |
| G 5 C 8 |

FIG 5B

S13
RREQ 3 B: S D 1 8

FIG 5C

S14
RREQ 3 A: S D 2 8

| S | | |
|---|---|---|
| B | 1 | B11 |
| G | 3 | B8 |

| B | | | |
|---|---|---|---|
| F | 1 | F8 | |
| G | 2 | F8 | (A,8) |
| S | 1 | S11 | |
| A | 1 | A11 | |
| D | 3 | A8 | (F,8) |

| A | | | |
|---|---|---|---|
| F | 1 | F8 | |
| G | 3 | B8 | (C,8) |
| B | 1 | B11 | |
| C | 1 | C8 | |
| D | 2 | C8 | (B,8) |
| S | 2 | B11 | |

| C | | | |
|---|---|---|---|
| A | 1 | A11 | |
| G | 4 | A8 | (D,8) |
| D | 1 | D8 | (A,8) |
| S | 3 | A11 | |

| D | | |
|---|---|---|
| C | 1 | C8 |
| G | 5 | C8 |

| F | | | |
|---|---|---|---|
| G | 1 | G8 | (B,8) |
| B | 1 | B11 | |
| A | 1 | A11 | |
| D | 4 | B8 | (G,8) |
| S | 2 | B11 | |

| G | | |
|---|---|---|
| F | 1 | F8 |
| D | 5 | F8 |

FIG 5D

S15
RREQ 3 F: S D 2 8

| S | | |
|---|---|---|
| B | 1 | B 11 |
| G | 3 | B 8 |

| B | | | |
|---|---|---|---|
| F | 1 | F 11 | |
| G | 2 | F 8 | (A,8) |
| S | 1 | S 11 | |
| A | 1 | A 11 | |
| D | 3 | A 8 | (F,8) |

| A | | | |
|---|---|---|---|
| F | 1 | F 11 | |
| G | 3 | B 8 | (C,8) |
| B | 1 | B 11 | |
| C | 1 | C 8 | |
| D | 2 | C 8 | (B,8) |
| S | 2 | B 11 | |

| C | | | |
|---|---|---|---|
| A | 1 | A 11 | |
| G | 4 | A 8 | (D,8) |
| D | 1 | D 8 | |
| S | 3 | A 11 | (A,8) |

| F | | | |
|---|---|---|---|
| | | | |
| G | 1 | G 8 | (B,8) |
| B | 1 | B 11 | |
| A | 1 | A 11 | |
| D | 4 | B 8 | (G,8) |
| S | 2 | B 11 | |

| G | | | |
|---|---|---|---|
| F | 1 | F 11 | |
| D | 5 | F 8 | |
| S | 3 | F 11 | |

| D | | |
|---|---|---|
| C | 1 | C 8 |
| G | 5 | C 8 |

FIG 6

| FIG 6A |
|--------|
| FIG 6B |

FIG 6A

S16
RREQ 3 G : S D 3 8

| S | |
|---|---|
| B 1 | B11 |
| G 3 | B 8 |

| B | | | |
|---|---|---|---|
| F 1 | F11 | | |
| G 2 | F 8 | | |
| S 1 | S11 | | |
| A 1 | A11 | (A,8) | |
| D 3 | A 8 | (F,8) | |

| A | | | |
|---|---|---|---|
| F 1 | F11 | | |
| G 3 | B 8 | | |
| B 1 | B11 | (C,8) | |
| C 1 | C 8 | | |
| D 2 | C 8 | (B,8) | |
| S 2 | B11 | | |

| C | | | |
|---|---|---|---|
| A 1 | A11 | | |
| G 4 | A 8 | | |
| D 1 | D 8 | (D,8) | |
| S 3 | A11 | (A,8) | |

| D | |
|---|---|
| C 1 | C11 |
| G 5 | C 8 |

| F | | | |
|---|---|---|---|
| G 1 | G11 | (B,8) | |
| B 1 | B11 | | |
| A 1 | A11 | | |
| D 4 | B 8 | (G,8) | |
| S 2 | B11 | | |

| G | | |
|---|---|---|
| F 1 | F11 | |
| D 5 | F 8 | |
| S 3 | F11 | |

FIG 6B

S17
RREQ 3 C: S D 3 8

FIG 7

| FIG 7A |
|---|
| FIG 7B |
| FIG 7C |
| FIG 7D |

FIG 7A

S18
RREP 3 D → C : S D 0 8

FIG 7B

S19
RREP 3 C→A: S D 1 8

FIG 7C

S20
RREP 3 A → B: S D 2 8

FIG 7D

S21
RREP 3 B → S: S D 3 8

FIG 8

METHOD FOR OPERATING A WIRELESS MESH DATA NETWORK WITH MULTIPLE NODES

CROSS-REFERENCE TO RELATED APPLICATIONS

This is a U.S. national stage of International Application No. PCT/EP2008/057057, filed on 6 Jun. 2008. Priority is claimed on German Application No. 10 2007 029 120.7, filed on 25 Jun. 2007. The contents of both applications are expressly incorporated herein by reference.

BACKGROUND OF THE INVENTION

1. Field of the Invention

The invention relates to a method for operating a wireless mesh data network comprising a plurality of network nodes, in which data frames are transferred from a source node via one or more intermediate nodes to a destination node, wherein the source node, the one or more intermediate nodes and the destination node constitute network nodes of the data network.

2. Description of the Related Art

The transfer of data frames between the source node and the destination node can in principle occur over different routes in mesh data networks. A route is understood to be a number of network nodes which are arranged adjacently relative to each other and which, at their ends, have a data connection to the source node and the destination node. In order that the transfer of the data frames from the source node to the destination node is not left to chance, a so-called route request is broadcast from the source node to all adjacent network nodes, which likewise in the context of a broadcast forward the route request to their adjacent network nodes, until the route request finally reaches the destination node. A so-called route reply is initiated by the destination node. During the transfer of the route request, and during the targeted return transfer of the route reply (i.e., unicast) to the source node, entries are created in so-called routing tables on each network node. This results in a defined path for the transfer of data frames between the source node and the destination node.

In the context of the present invention, therefore, a path or data path (or route) is understood to represent the transfer of data frames between the source node and the destination node through one or more specified intermediate nodes. Data frames which are transferred from the source node to the destination node along the data path are transferred on a so-called forward route. When data frames are transferred from the destination node to the source node, this is referred to as a so-called reverse route in the following description.

In the case of such wireless mesh data networks, the problem exists that individual data frames can be misdirected on a path between the source node and the destination node, thereby causing loops or data loops. This adversely affects the data communication between the source node and the destination node. The incorrect transfer of data frames can occur in all known transfer protocols (i.e., routing protocols). The formation of such unwanted data loops can occur as a result of faulty network nodes, by chance or by malice when data frames are transferred to a network node which precedes the transferring network node on the path in the transfer direction. As a result of the loop formation, the data frame or data frames are forwarded to a network node which is located closer to the source node in a forward direction on the path. As a result, the available bandwidth of the network can be substantially reduced.

In order to prevent the continuous transport of a misdirected data frame, it is customary to integrate lifetime information in the data frames. This is done in the case of data packets according to the Internet protocol (IP) and in the case of data packets as per the IEEE 802.11s specification, for example. The lifetime information is referred to as Time-to-Live (ttl). This is an integer value, which is normally set to 255 by the sender of the data frame. Each time the data frame is forwarded to a new network node, the value is decremented by 1. As soon as the lifetime value is 0, the data frame is discarded and is no longer transported onward in the data network.

A further known protection mechanism is referred to as "source routing". In this context, the recipient of a data frame can check whether the sender (transmitter) of the data frame is authorized to forward this data frame to the recipient. Here the, check is based on path information contained in the data frames.

It is also known to use unique sequence numbers when transferring data frames. This makes it possible to verify whether data frames have already been transferred. With reference to the sequence numbers, it is then possible to infer a loop formation if a data frame arrives a second time or repeatedly at a network node.

The use of so-called precursor lists is known from the Ad-hoc On-demand Distance Vector Routing (AODV) algorithm as described in RFC 3561 for IP MANET routing. The precursor lists are used for error notifications of the network nodes. Here, a precursor list is generated both for the forward direction and for the reverse direction of a data path. This occurs during the processing of the route reply which was broadcast by the destination node. This procedure is based on both directions (forward direction and reverse direction) following the same path. However, the precursor lists used in the context of AODV cannot prevent the occurrence of loops in this way.

SUMMARY OF THE INVENTION

It is therefore an object of the invention to provide a method by means of which data loops can be avoided when transferring data frames in a wireless mesh data network.

It is also an object the invention to provide a method by means of which the transfer of data frames in a wireless mesh data network allows maximally efficient utilization of the resources available in the data network.

In the context of the inventive method for operating a wireless mesh data network comprising a plurality of network nodes, in which data frames are transferred from a source node via one or more intermediate nodes to a destination node, the source node, the one or more intermediate nodes and the destination node constitute network nodes of the data network. During the transfer of a data frame, at least many of the network nodes which receive the data frame check, with reference to a precursor list which is assigned to the destination node of the data frame, whether the network node sending the data frame is included in the precursor list. If the result is positive, the data frame is transferred to a further network node. If the result is negative, the data frame is discarded or an error recovery routine is performed.

These and other objects and advantages are achieved by a method for operating a wireless mesh data network comprising a plurality of network nodes, in which data frames are transferred from a source node via one or more intermediate nodes to a destination node, the source node, the one or more intermediate nodes and the destination node constitute network nodes of the data network. During the transfer of a data frame, at least many of the network nodes which receive the data frame check, with reference to a precursor list which is assigned to the destination node of the data frame, whether the network node sending the data frame is included in the precursor list. If the result is positive, the data frame is transferred to a further network node. If the result is negative, the data frame is discarded or an error recovery routine is performed.

In accordance with an embodiment of the invention, precursor lists are utilized for the purpose of tracking data frames which originate from network nodes that are not authorized or intended to transfer the data frame concerned. Precursor lists are lists containing details of immediately adjacent network nodes. Data loops in a wireless mesh data network can be prevented in this way. The prevention of data loops makes it possible to prevent the wastage of valuable bandwidth in the data network.

In order to reliably prevent wait loops, the network nodes must check whether the network node sending the data frame is contained in the precursor list. The check is preferably performed by all network nodes. Checking by the destination node is not necessary.

In an embodiment, the check is performed by all network nodes except for the destination node and the intermediate node immediately preceding the destination node. Correspondingly, the check would likewise then not be performed by the intermediate node immediately preceding the source node when the source node is the destination of a message (i.e., the reverse path).

In another embodiment, a routing table is set up for the source node, the destination node and the intermediate node or nodes in each case, wherein each of the routing tables comprises at least one entry. For each entry in the routing table, the precursor list is set up comprising immediately adjacent nodes which can transfer a data frame to the relevant network node. Within a data path, those adjacent network nodes from which data frames may be received are therefore specified for each of the network nodes.

The creation of the routing table occurs during the transfer of a route request which is initiated by the source node and a route reply which is initiated by the destination node. A route request is also known as a route request message. A route reply is known as a route reply message to a person skilled in the art. Route requests are broadcast by the source node as a broadcast message. By contrast, the route reply initiated by the destination node takes the form of a unicast message. In the routing tables, entries are set up for the forward direction of a data path and for the reverse direction of a data path. The forward direction of a data path extends from the source node to the destination node. The reverse direction goes from the destination node to the source node correspondingly.

In accordance with another embodiment, the creation and/or updating of the precursor list is performed in the context of the route reply initiated by the destination node.

In another embodiment, a data frame comprises the address of the source node, the address of the destination node, the address of the network node sending this data frame and the address of the network node receiving this data frame. The network node receiving the data frame checks whether the address that has been allocated to it corresponds to the address of the destination node in the data frame. If the result of the check is positive, the data frame is supplied to a further unit for processing, in particular a higher layer in the Open Systems Interconnection (OSI) reference model. This means that the data frame has reached the destination node.

In a still further embodiment, an entry in the precursor list comprises a Media Access Control (MAC) address or an IP address and a lifetime of the entry. A precursor list is therefore a list of MAC or IP addresses. Elements of a precursor list are immediate neighbors (network nodes) of the network node, which are allowed to transfer the data frame to this network node. This is because the network node which transfers the data frame to the network node concerned is situated on the data path to the destination node. In accordance with the contemplated embodiments of the invention, a precursor list is created for each routing table entry. In many routing protocols, this means one entry per destination node, because there is only a single routing table entry per destination node. Consequently, a precursor list for a destination node can have n entries, where $n \in [1,N]$. N is the number of sources which can have active data paths via this node ($N \geq 1$).

In addition to the use of precursor lists for detecting misdirected data frames, it is an object of the invention to provide a procedure for creating and maintaining the precursor lists used for this purpose.

In accordance with the disclosed embodiments, value pairs comprising a MAC or IP address and a lifetime are stored as entries in the precursor lists. The lifetime of the entry is comparable with the lifetime value in the AODV algorithm. The underlying principle consists in resetting the lifetime of an entry in the precursor list of a network node to an initial value when this network node receives a data frame from the network node whose address corresponds to the MAC address in the entry. The lifetimes are updated for entries in both forward and reverse directions, if the lifetimes of the routing table entries are also updated in both the forward and reverse directions upon receipt of a corresponding data frame. Furthermore, an entry in the precursor list is deleted when the lifetime of the entry has expired. It is thus possible to ensure that the risk of data loop formation is minimized.

The lifetime of an entry in the precursor list is maximally as long as a path lifetime value from the source node to the destination node, wherein the path lifetime value is included as information in the routing table entry.

In an embodiment, the lifetime of an entry in the precursor list and the path lifetime value in the relevant routing table entry are updated at the same time. Here, the lifetime can also be updated by means of route replies (route reply messages), for example. However, there is no provision for route requests (route request messages) to effect an update of the precursor lists.

The reason for this is as follows: the precursor lists are created during a so-called route discovery, which is intended to establish the data path between the source node and the destination node. The basic mechanisms derive from the original AODV specification in this case. A published document relating to this is found at [1]. Here, the conventional procedure is extended by the addition of lifetimes for the entries in the precursor lists. The route request, which is broadcast by the source node to all network nodes of the data network, generates reverse directions from all network nodes to the source node. Since these reverse routes are formed from the end, i.e., from the destination node, the preceding network nodes are still unknown, and therefore nothing can be entered in the precursor list for the routing table entry of the source node. By contrast, the route reply which is transferred from the destination node to the source node using a unicast mechanism results in the generation of entries in the precursor lists for both the forward route and the reverse route. Here, the information "destination_node" and "source_node" is taken from corresponding fields of the route reply.

The following steps are performed in order to populate the routing table:
  routingtable(destination_node).create;

routingtable(destination_node).lifetime.update
(RREP.lifetime);
routingtable(destination_node).precursor_list.add(routingtable(source_node)next_hop, RREP.lifetime);
routingtable(source_node).precursor_list.add(route_reply.transmitter,routingtable(source_node).lifetime).

The creation of a precursor list for the corresponding routing table entry is not necessary on any intermediate node which is adjacent to the source node in the case of a data frame transfer route between the destination node and the source node, or is adjacent to the destination node in the case of a data frame transfer route between the source node and the destination node. However, the contemplated embodiments of the method are simplified and accelerated if a precursor list is also created in these cases.

Both AODV and HWMP (Hybrid Wireless Mesh Protocol) allow the intermediate nodes to respond to a route request with a route reply if they know a valid route to the destination node. In such a case, the following updates must be performed in the routing tables of the intermediate node which generates the route request. In this context, the fields "destination_node" and "source_node" are taken from the corresponding fields of the route request:

routingtable(destination_node).precursor_list.add(routingtable(source_node).next_hop, routingtable(destination_node).lifetime)
routingtable(source_node).precursor_list.add(routingtable(destination_node).next hop, routingtable(source_node).lifetime)

If a further network node, which is not the source node or the destination node or one of the intermediate nodes on a data path between the source node and the destination node, after receiving a route request of the source node (but no route reply), transfers a data frame to the source node via a further intermediate node which is the next network node on a reverse path to the source node but does not contain the further network node in the precursor list of the routing table entry for the source node, an embodiment provides for the further intermediate node to discard the data frames received from the further network node.

According to a further embodiment, the data path which is formed between the further network node and the source node is identified as invalid in the further network node. In order to prevent data frames from being unnecessarily sent from the further network node to the source node, such a path is marked so that the further network node can perform a route discovery to the source node. This is performed instead of using the reverse path which was formed between the source node and the further network node in the context of the route discovery.

In an alternative embodiment, the precursor lists for the path between the further network node and the source node are filled before the data frame is transferred from the further network node to the source node. This can be achieved by sending a route reply from the further network node to the source node, for example.

In a further alternative embodiment, upon receipt of a route request, the addresses of all network nodes adjacent to a network node are entered with an expiry value in the precursor list of this network node as a temporary entry when a route request is received.

According to a further embodiment, the network node which is adjacent to the network node and which broadcast the route request is not entered in the precursor list of this network node.

According to a further embodiment, the temporary entry in the precursor list is given an expiry value (e.g., a TTL (time-to-live value) in the Internet protocol header, e.g., IPV4) which has the same value as the reverse path that was established by the route request.

In a further optional embodiment, the temporary entries can be deleted from the precursor list when an entry is created in the precursor list in the context of the route reply that is initiated by the destination node.

The same problem also exists when using proactive route requests in the context of a proactive extension for so-called Tree Routing in HWMP. The unidirectional tree from the starting node (root tree) is triggered by a route request, wherein the route request is transferred to all of the network nodes that are connected to the starting node. This action generates the reverse path to the starting network node, but it is not possible to generate the precursor list. In this case, HWMP makes use of a similar solution to that proposed by the invention. If a proactive route reply flag is set, a route reply is broadcast in response to a route request. As a result of this, the precursor list can be filled as usual. If the proactive route reply flag is not set, a route reply can be sent before the data frames, such that the precursor list is created "just in time".

The disclosed embodiments of the invention provide a simple mechanism for tracking misdirected data frames, in order to prevent the creation of data loops as a result of deliberate or fault-related forwarding. This is effected by using precursor lists for tracking the misdirected data frames. In this case, the sender of the data frame is compared with the permitted precursors (=senders or transmitters) in the precursor list. In this way, the contemplated embodiments of invention extends the mechanism of precursor lists as specified for AODV. An entry is assigned a lifetime in the precursor list, such that the contents of the precursor list then correspond to the active data paths in the wireless mesh data network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The disclosed embodiments of the invention are further explained below with reference to the figures, in which:

FIGS. 3-8 respectively show routing tables for the network nodes of FIG. 1, wherein the population of the routing tables and precursor lists contained therein is explained in the context of establishing a data path between two of the network nodes in the data network of FIG. 1.

DETAILED DESCRIPTION OF THE PREFERRED EMBODIMENTS

Figure 1:
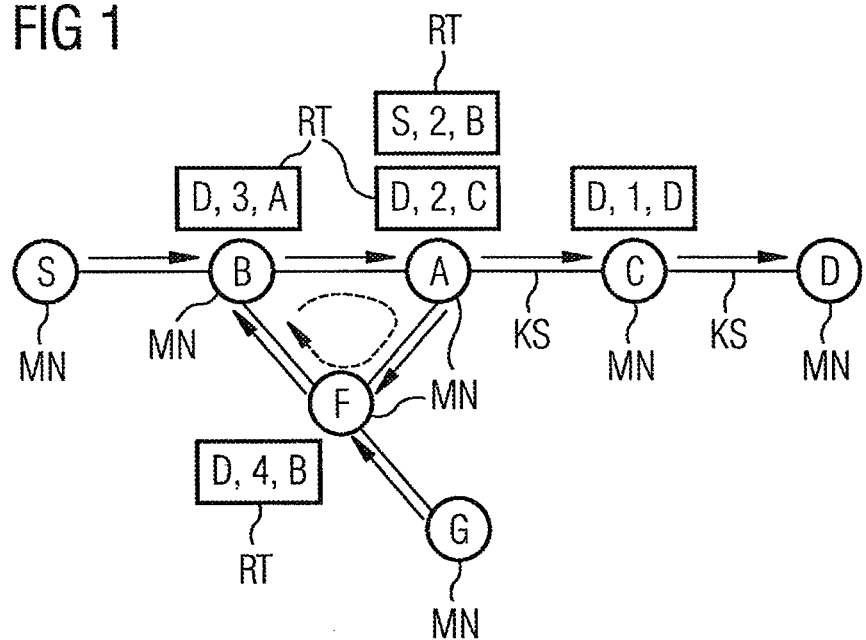
FIG. 1 shows a mesh data network comprising a plurality of network nodes, with reference to which the method forming the basis of the invention.

By way of example, FIG. 1 shows a mesh data network comprising a plurality of network nodes MN. Some of the network nodes MN are connected together by communication links KS for the purpose of exchanging data. The communication links KS are wireless. Each of the network nodes MN is assigned a unique address, whereby data frames can be transferred from a source node to a destination node. In FIG. 1, the addresses of the network nodes MN are identified by the reference signs S, B, A, C, D, F and G. The transfer of a data frame from one network node MN to an adjacent network node MN over the communication link KS is indicated by an arrow. The transfer of data frames from a source node of the data network to a destination node of the data network by one or more intermediate nodes, wherein source node, destination node and intermediate nodes are network nodes of the data network, occurs hop-by-hop, i.e., from network node to network node.

For example, if data frames are to be transferred from the source node S to the destination node D of the data network as per FIG. 1, it is firstly necessary to determine a data path in which the intermediate nodes between the source node S and the destination node D are identified (e.g., the network nodes B, A and C in the exemplary embodiment), wherein routing tables are assigned to the relevant network nodes. The routing tables referred to in the following description are denoted by the reference sign RT in FIG. 1. In the exemplary embodiment illustrated here, an entry in a routing table RT comprises three values. The first value specifies the address of the destination node. The second value represents a path metric, which is effectively the number of hops until the destination node is reached. The third value represents the address of the network node to which the data frame must be transferred next. This is also referred to as the "next hop".

The determination of the data path is performed by means of so-called "route discovery", which is sufficiently well known from the operation of a wireless mesh data network. In order to achieve this, a route request is generated by the source node S and is transferred to all the network nodes connected to the source node. This transfer method is known as broadcast and is likewise performed by the intermediate nodes receiving such a route request (also referred to below as a route request message). If the destination node D receives such a route request message, it responds with a route reply (also referred to below as a route reply message). Unlike the route request message, however, the route reply message is transferred to the source node S in a targeted manner. This is also known as unicast.

The routing tables of relevant intermediate nodes on a data path can be created and filled in the context of route discovery.

Figure 2:
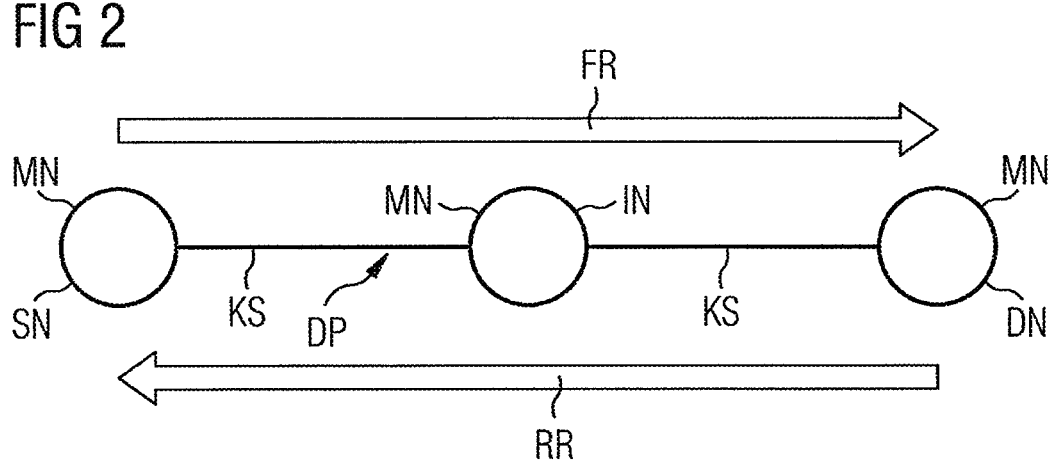
FIG. 2 shows a diagram illustrating definitions of terms as used in the description.

FIG. 2 shows a standard convention in the description of mesh data networks. For purposes of simplicity, it is assumed here that the source node SN is connected to the destination node DN via only one intermediate node IN. A wireless communication link KS is configured in each case in between the source node SN and the intermediate node IN, and between the intermediate node IN and the destination node DN. The network nodes SN, IN and DN lie on a data path DP, by which the data frames are transferred. The data path DP was determined using the route discovery method described above. Data frames which are transferred from the source node SN to the destination node DN are transferred in a forward direction or on a forward route FR. Data frames which are transferred from the destination node DN to the source node SN are transferred in the reverse direction or on a reverse route RR.

Reference is made to this convention in the following.

In the following brief description of the problem, with reference to FIG. 1, it is assumed that the data path between the network node S as source node and the network node D as destination node is as follows: S-B-A-C-D. A further data path is to be formed between the network node G as source node and the network node D as destination node. The data path here is, for example: G-F-B-A-C-D.

The network node B, which represents an intermediate node, has a routing table entry which contains the network node D as destination node. Three hops are required before the network node D is reached, wherein a data frame received from B must be transferred to the network node A (likewise an intermediate node). Correspondingly, the network node A has a routing table entry which contains the network node D as destination node. Two hops are required before the destination node D is reached, wherein a data frame received from A must be transferred to the network node C (an intermediate node). Correspondingly, the network node C has a routing table entry which contains the network node D as destination node. One hop is required before the destination node D is reached, wherein a data frame received from C must be transferred to the network node D (the destination node). If the network node F (likewise an intermediate node) receives a data frame for the destination node D, it receives information from a routing table entry to the effect that four hops must be completed before the destination node is reached. Data frames received from the network node F must be transferred onward to the network node B.

In the event of a malfunction of the network node A, which can be of a deliberate or fault-related nature, it is possible for data frames to be transferred to the network node F instead of to the network node C. This can be facilitated, for example, by the information from the route request which network node A received from network node F. As a result, the data loop identified by the broken marked arrow in FIG. 1 is produced. The network node F will, due to its routing table entry, actually forward the data frame to B, which in turn transfers the data frame to A again.

Since this loop formation costs valuable bandwidth in a wireless mesh data network, the contemplated embodiments of the invention provide for each routing table entry to be supplemented by a precursor list. By providing precursor lists, it is possible to identify data frames from network nodes which are not permitted to send them to the network node receiving the data frame. In this way, it is possible to prevent data loops.

Each precursor list created per routing table entry represents a list of Media Access Control (MAC) addresses. Elements of the precursor list are network nodes which are immediately adjacent to the network node having a precursor list and which transfer data frames to this network node in accordance with the routes determined by the routing protocol. A precursor list of a routing table entry of a network node can therefore feature n∈[1N] entries, where N is the number of source nodes having an active data path via the node concerned.

The standard IEEE 802.11s (WLAN Mesh Networking) defines a format for data frames, which format comprises six addresses. The data frame defined therein comprises inter alia the address of the network node transferring the data frames (transmitter address). This network node is the preceding network node (hop) in the data path. In other words, this is the precursor. This address, i.e., the transmitter address, is compared with the address which is contained in the precursor list on the path to the desired destination node. If the receiving node is the destination node, the comparison is no longer required because the transfer of a data frame to the destination node will not result in a data loop.

In the preferred embodiment, three addresses are required to perform the method: the address of the destination node, the address of the network node which transfers the data frame, and the address of the network node which receives the data frame. As explained above, a comparison determines whether the destination address corresponds to the address of the network node receiving the data frame. If so, the received data frame is supplied to a higher processing layer. If the destination address does not correspond to the address of the network node receiving the data frame, a check determines whether the address of the sending network node (transmitter) is included in the precursor list of the routing table entry for the destination node. If the result is positive, the data frame has been transferred correctly. The network node receiving the data frame thereupon transfers it to the network node which is included in the corresponding routing table entry as the next hop. In the event of a negative check, the data frame is considered to be misdirected because the transmitter is not the preceding network node on the data path and therefore should not have been allowed to transfer the data frame to this neighbor. The data frame is therefore either discarded or supplied to an error recovery routine.

In addition, the entries in the precursor lists are supplemented by a lifetime value. An entry in a precursor list therefore contains the value pair (MAC address, lifetime). The addition of lifetime values makes it possible for the precursor lists to correspond to the active data paths in the data network. In other words, it is thereby ensured that the entries in the precursor lists are only provided for active data paths.

When the lifetime of an entry in the precursor list expires, the corresponding entry is deleted from the precursor list. The checking or updating of a lifetime value occurs whenever a data frame is received by a network node and a corresponding precursor list entry is present. Here, the lifetime of the precursor list entries can be updated in both directions, i.e., in a forward direction and a reverse direction of the data path. This corresponds to the procedure that is described for AODV/HWMP.

The new value of a lifetime entry is the maximal value possible for the lifetime. For the purposes of the disclosed embodiments in accordance with the invention, no lifetime value of a precursor list entry is longer than a corresponding lifetime of the data path. Updating of a lifetime value in the precursor list generally takes place at the same time as the updating of the lifetime value of a routing table entry. The lifetime values of the precursor list entries are also updated when route reply messages pass through the network node concerned. By contrast, route request messages do not effect an update of the precursor list lifetime entry.

The precursor lists assigned to the routing table entries are likewise generated in the context of the route discovery. Here, a special case can occur during the route discovery process. If the source node S wants to communicate with the destination node D, a route discovery is initiated by the source node S, whereby a route request message is transferred to all network nodes in the data network. The route request message generates return paths from all network nodes to the source node S. However, as explained at the outset, only a single data path, on which the destination node D sends back a route reply, is formed between the source node S and the destination node D. The precursor lists are generated in the network nodes as a result of this route reply message, wherein this only occurs in those network nodes situated on the data path between S and D. As explained at the outset, the data path is S-B-A-C-D. In the other network nodes, however, specifically the network nodes F and G in the exemplary embodiment, such precursor lists are not generated in the associated routing table entries. Nonetheless, a return path from the network node G to the source node S is actually valid.

If the network node G transfers a data frame to the source node S on this return path, it sends a data frame to the next network node, which is the network node F in the exemplary embodiment. However, the network node F, which is situated adjacent to the network node G, does not have a precursor list entry for the network node G. Therefore the data frames which are transferred from G are discarded at the network node F, although they were transferred on a path that is itself valid.

Three possibilities are available for solving this problem.

1. The return path which was formed between G and S is considered as an invalid path. In order to prevent the unnecessary sending of data frames, this path must be marked correspondingly so that the network node G can initiate a route discovery to the network node S instead of using the return path to S, which was initiated by the route discovery initiated by S.

2. Precursor lists can be generated by transferring a route reply message to S before the actual data frames are transferred from G to S.

3. Alternatively, the addresses of all adjacent network nodes can be entered in the precursor list for the return path. This is not necessary for the network node which broadcast the route request message. For the network node F, these would be the adjacent network nodes A and G. The adjacent network node B does not need to be included in the precursor list because it broadcasts the route request message. These entries are given a timeout which has the same value as the reverse route that was set up by the route request message. This simple solution nonetheless has the disadvantage that, during the route discovery, there is a short period during which there is no protection against data loop formation.

Figure 9:
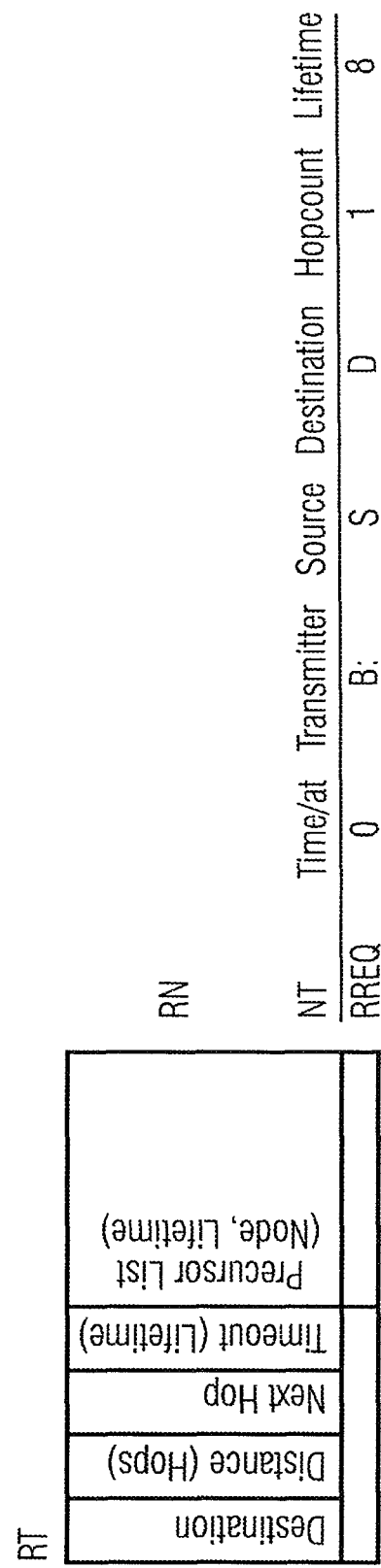
FIG. 9 shows a legend for the designations used in FIGS. 3 to 8.

The subsequent FIGS. 3 to 8 now clarify the manner in which the routing table entries with the assigned precursor lists are generated, which is performed with reference to the data network illustrated in FIG. 1. In order to allow greater comprehensibility, FIG. 9 shows a legend for the designations used in the FIGS. 3 to 8.

A routing table RT comprises five entries: the address of a destination node ("destination"), the number of intermediate nodes ("distance (hops)") on the path to the destination node, the address of the next network node ("next hop"), a lifetime value for the routing table entry ("time out (life time)") and a precursor list, wherein each entry in the precursor list comprises the address of a network node and a lifetime entry ("precursor list (node, life time)").

In the context of the description, two message types NT are used. RREQ designates a route request. RREP designates a route reply message or route reply. Both routing messages RN comprise the following values: time point ("time/at"), address of the sending network node ("transmitter"), address of the source node ("source"), address of the destination node ("destination"), number of network nodes to the destination node ("hop count"), and lifetime ("life time").

Figure 3B:
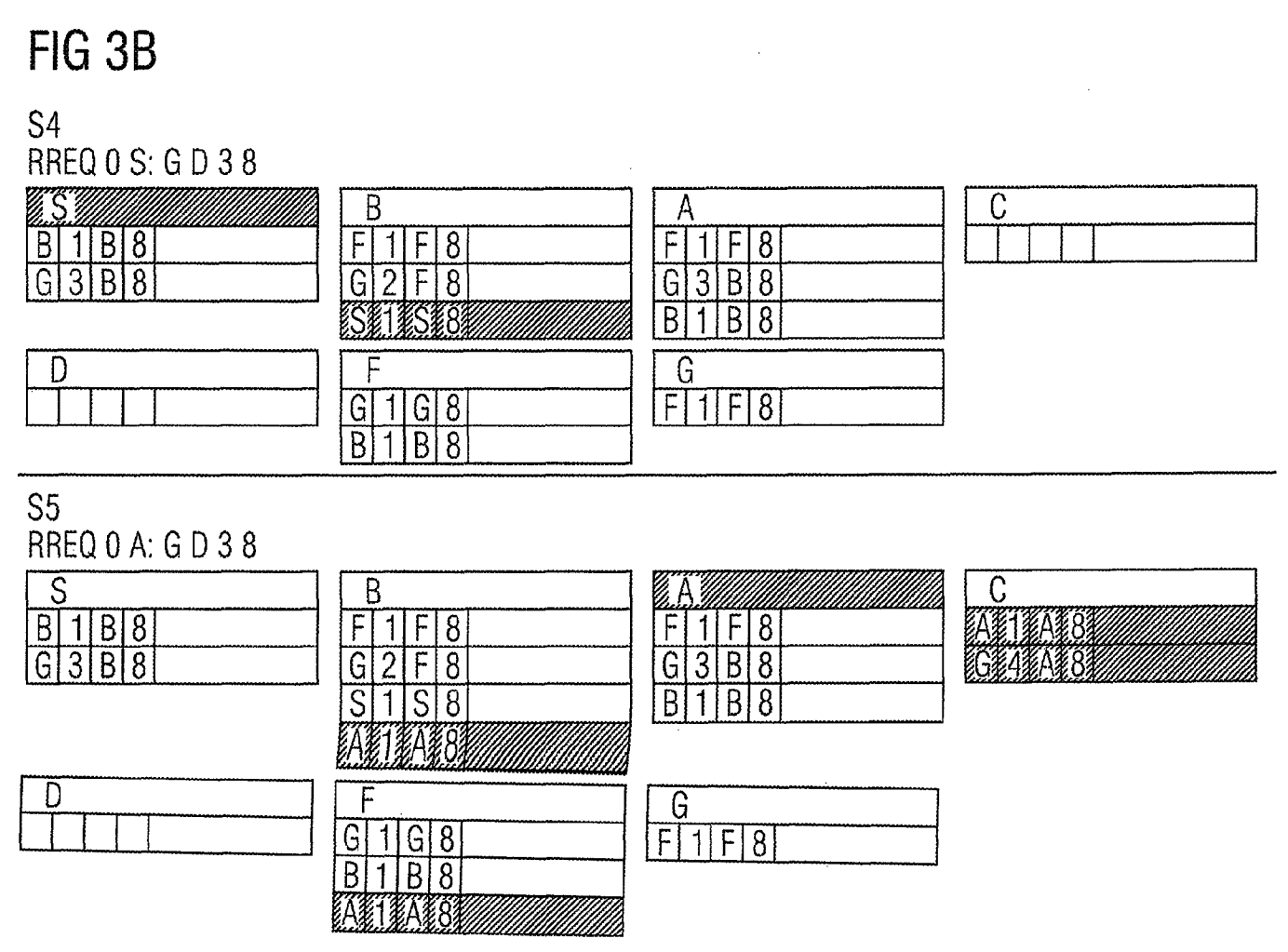

FIG. 3 illustrates the setup of a data path between the network node G as source node and the network node D as destination node, as indicated in steps S1 to S6. In particular, it is possible to see how the routing tables of each of the network nodes S, B, A, C, D, F and G are generated after a route request message is broadcast by the source node G. The highlighted fields in the individual tables show the sender of the route request message and those fields in a routing table which, as a result of processing the route request message, entail a change.

A route request message RREQ is broadcast by the network node G, as indicated in step S1. The network node G is therefore the transmitter of the message. At the same time, G represents the source node of the data network, and therefore G is also entered in the field "source". As a destination, the route request message contains the network node D (destination). Since the transmitter and source of the message are identical, 0 is entered for the hop count value. The value 8 is selected arbitrarily as a lifetime value. It can be seen in the associated routing tables of the network nodes G and F that G is the sender of the message. Information concerning the reverse route is stored in the routing table of the network node F, which receives the route request message RREQ from G. The address of the network node G is therefore registered as the destination, since this is the source node of the route request message. The distance to this is one hop. In order to arrive at the destination of the reverse route, i.e. the source, the node G must be reached as the next node (next hop). The 8 time units from the route request message are selected as a lifetime for the routing table entry for the reverse route to the source node G.

The route request message RREQ is sent to those network nodes connected to network node F via communication links KS, as indicated in step S2. These are the network nodes B, A and G in the exemplary embodiment depicted in FIG. 1. The route request message RREQ contains the following information: sender, i.e. transmitter, of the message is the network node F. The route request message RREQ was initiated by the source node G, and therefore this is entered in the "source" field. The destination remains the destination node D, and therefore this is entered in the "destination" field. The network nodes F and G are a distance of one hop count from each other. The lifetime remains at the set value of 8. In each of the network nodes B, A and G which receive the route request message from F, routing table entries are set up respectively: in the network nodes B and A for both the transmitter network node F and the source node G, and in the network node G for only the transmitter network node F. The distance to the destination of the reverse route (source) is adjusted to have the value 2.

In this way, the route request message RREQ is transported onwards until it finally reaches the destination node D in step S6. The network node D has two routing table entries, one containing information for the network node C as destination and one containing information for the network node G as destination.

Figure 4B:
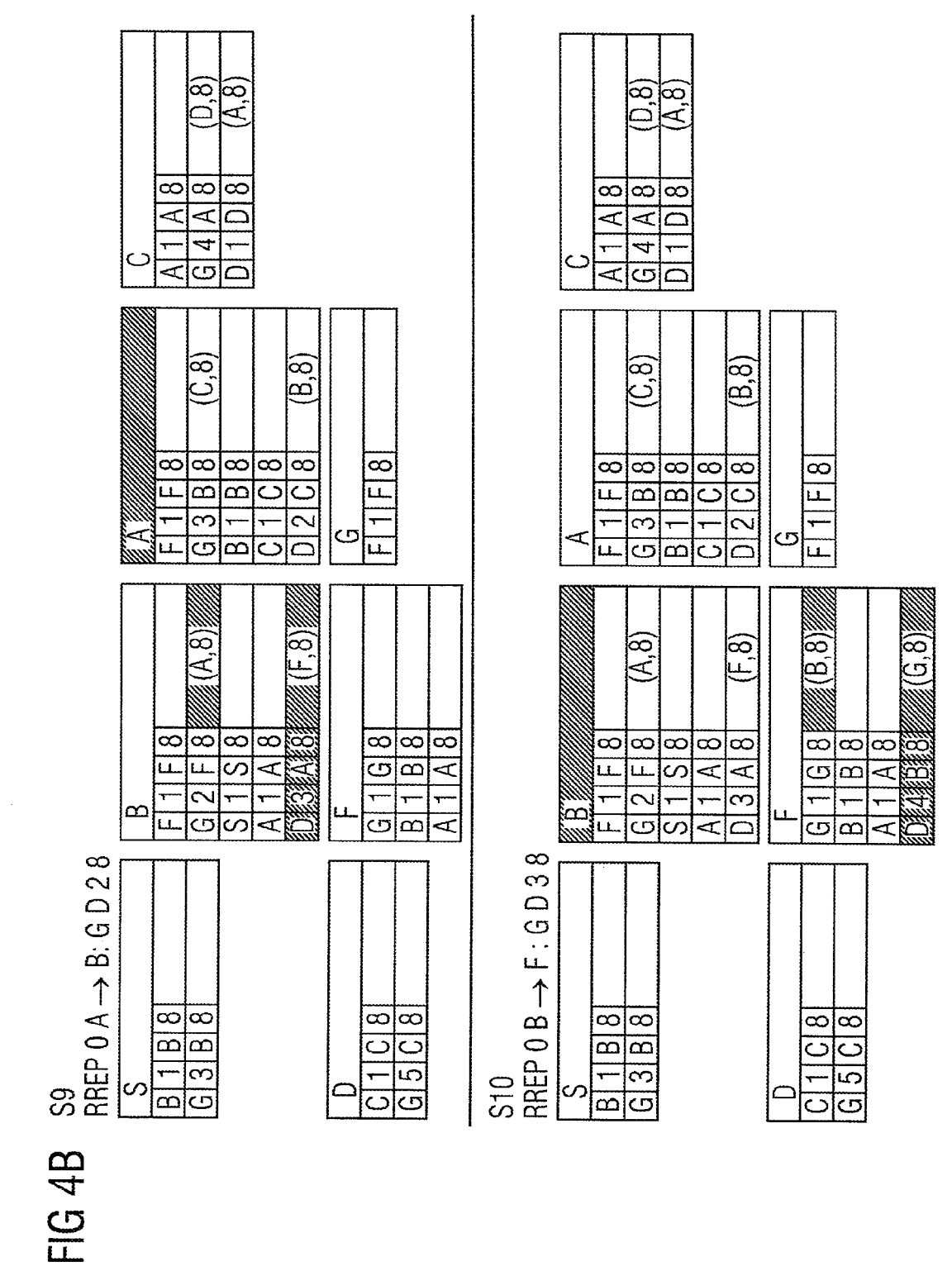

Steps S7 to S11 in FIG. 4 illustrate a route reply message which is broadcast by the destination node D. In this context, the source node G is the recipient of the route reply message. In this context, it can be seen from the relevant routing tables that a precursor list, comprising the address of the preceding network node on the data path and a lifetime value, has been entered for many of the routing table entries.

FIG. 4 illustrates a route reply message which is broadcast by the destination node D, as indicated in steps S7 to S11. In this context, the source node G is the recipient of the route reply message. Here, it can be seen from the relevant routing tables that a precursor list, comprising the address of the preceding network node on the data path and a lifetime value, has been entered for many of the routing table entries.

The broadcast of the route reply message is performed by the network node D. The transfer of the route reply message occurs at the adjacent network node C. The "source" field still contains the source node G, which initiated the route request message. The destination node is still network node D, to which the source node G wants to establish a data path. The hop counts are counted from the viewpoint of the sender of the route reply message, and therefore the value is 0. The lifetime is set to 8, corresponding to the lifetime from the route request message, but can be selected arbitrarily in principle. The network node C, which receives the route reply message from the network node D, can now set up a new routing table entry for the network node D. In addition, a precursor list entry can be set up for the routing table entries relating to the network nodes G and D (destination in each case). If a message is to be sent from the network node C to network node G as the destination, network node D represents the precursor in the data path. Conversely, when sending a data frame from the network node C to network node D as the recipient, network node A represents the precursor in the data path. This information can be taken from the routing table entry for network node G as the recipient, since A is entered as the next hop here.

In a corresponding manner, the route reply message is transported from network node C to network node A and thence to network node B, then to network node F and to network node G. As part of this activity, routing table entries are supplemented and relevant precursor lists are each generated in the described manner.

Figure 5B:
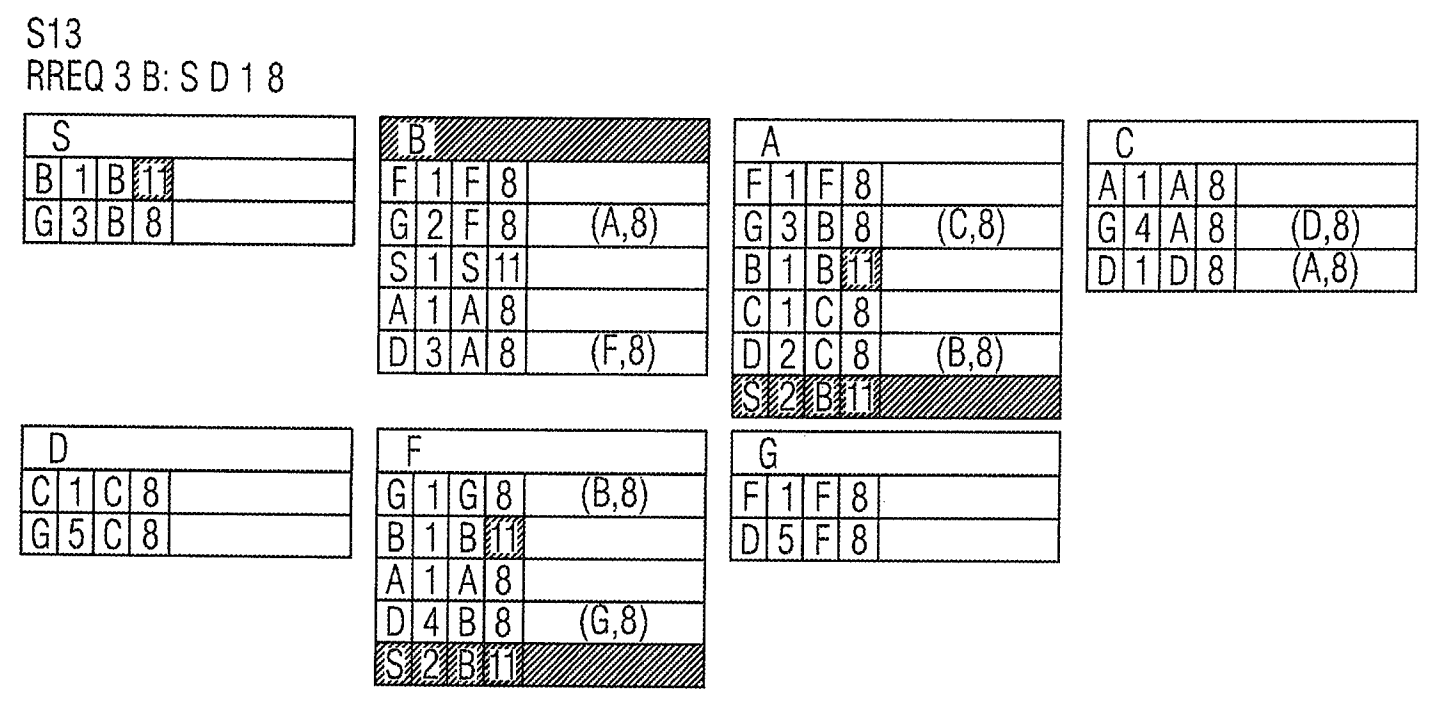
Figure 6B:
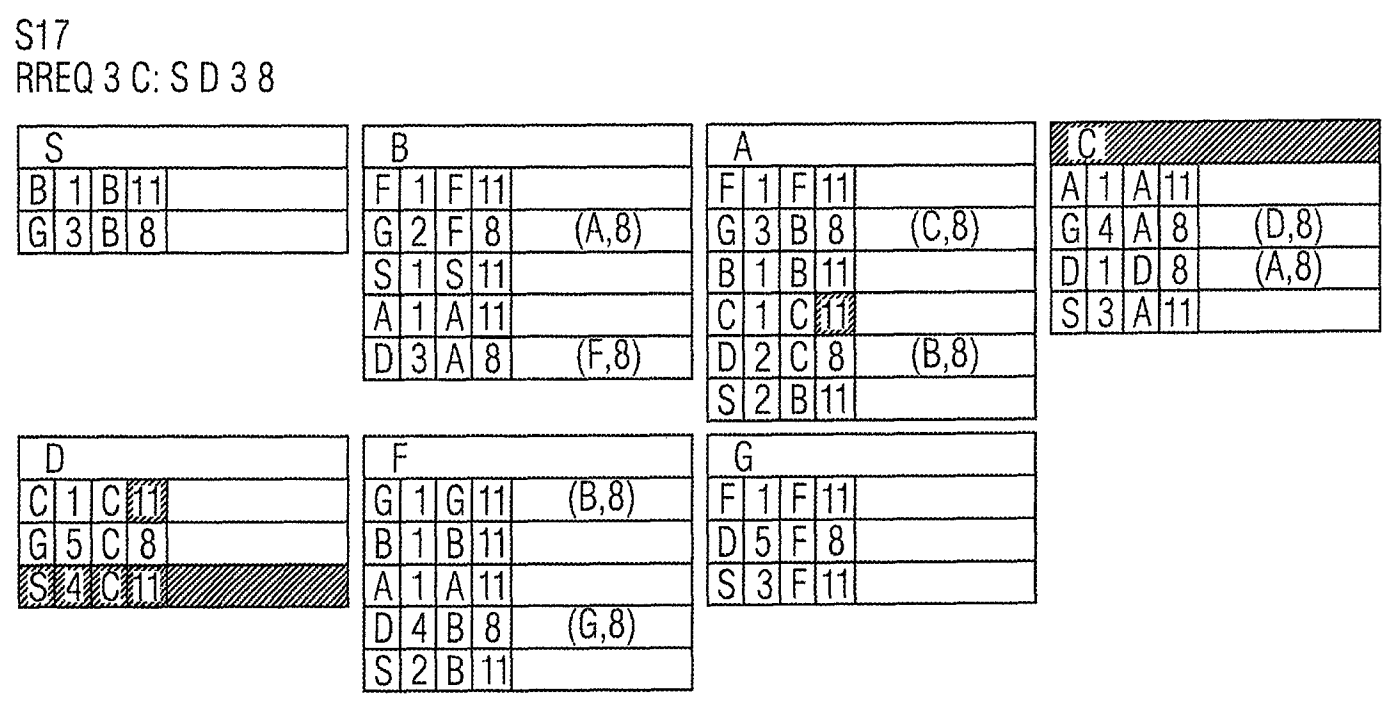
Figures 7, 7A, 7B, 7C, 7D:
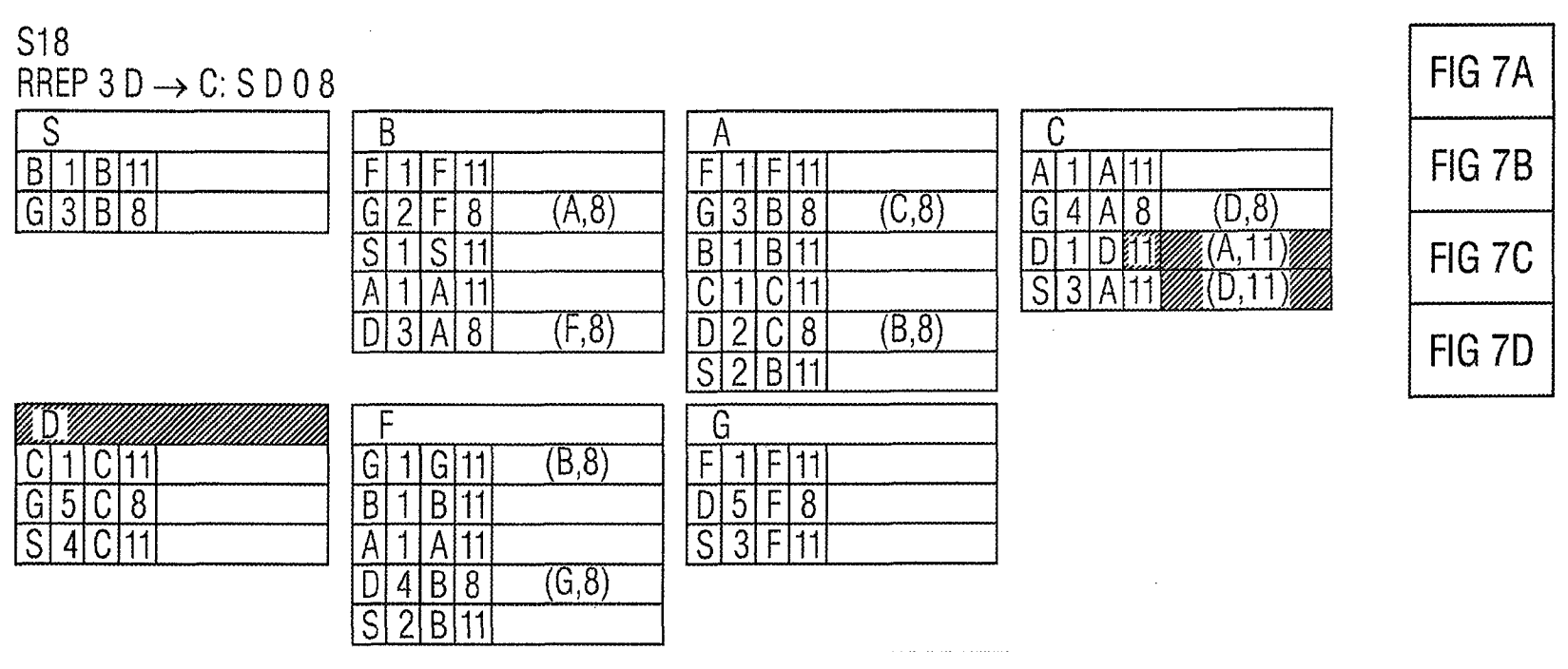
Figure 7B:
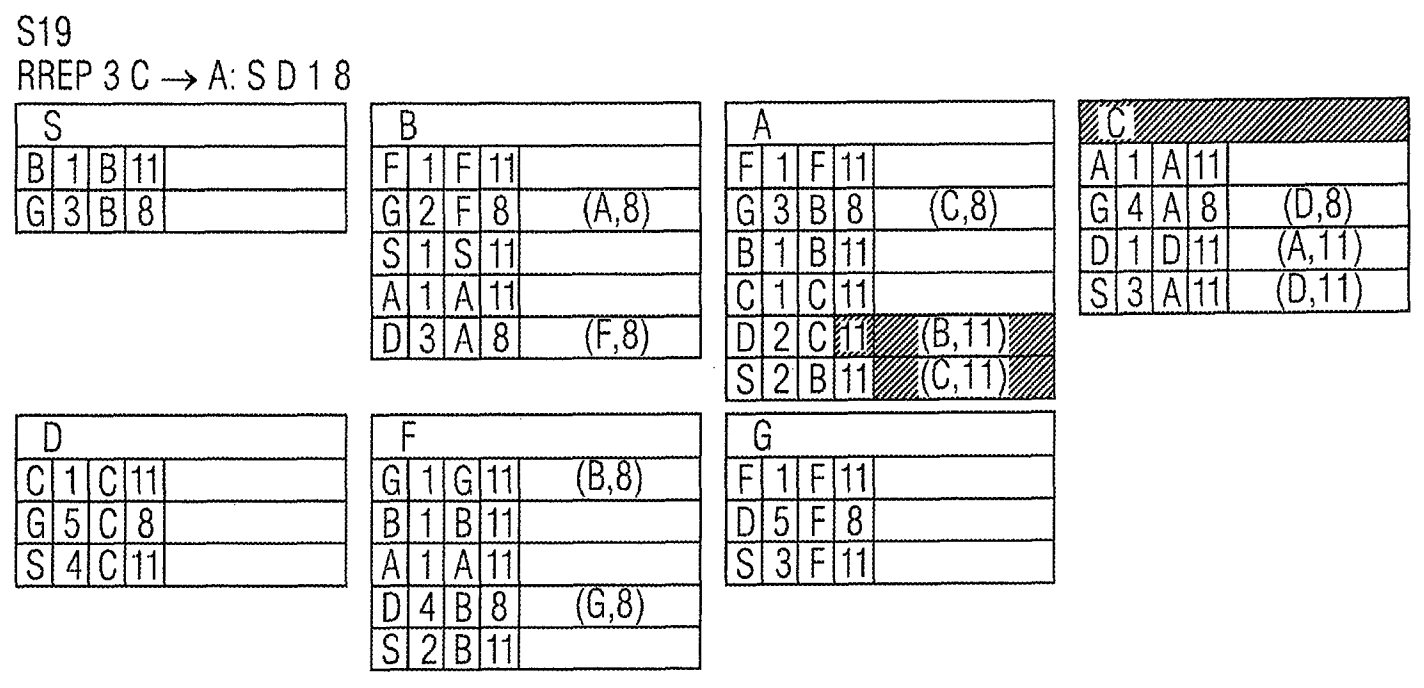
Figure 7C:
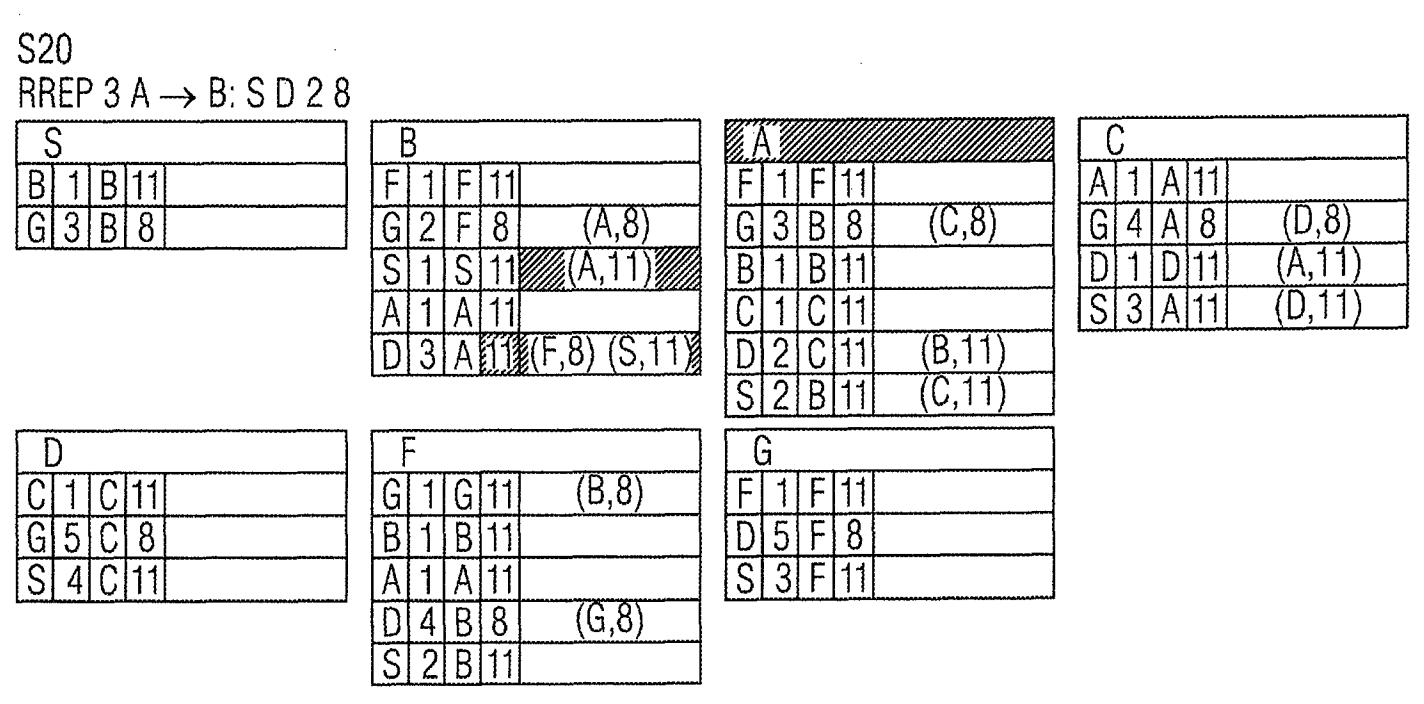
Figure 7D:
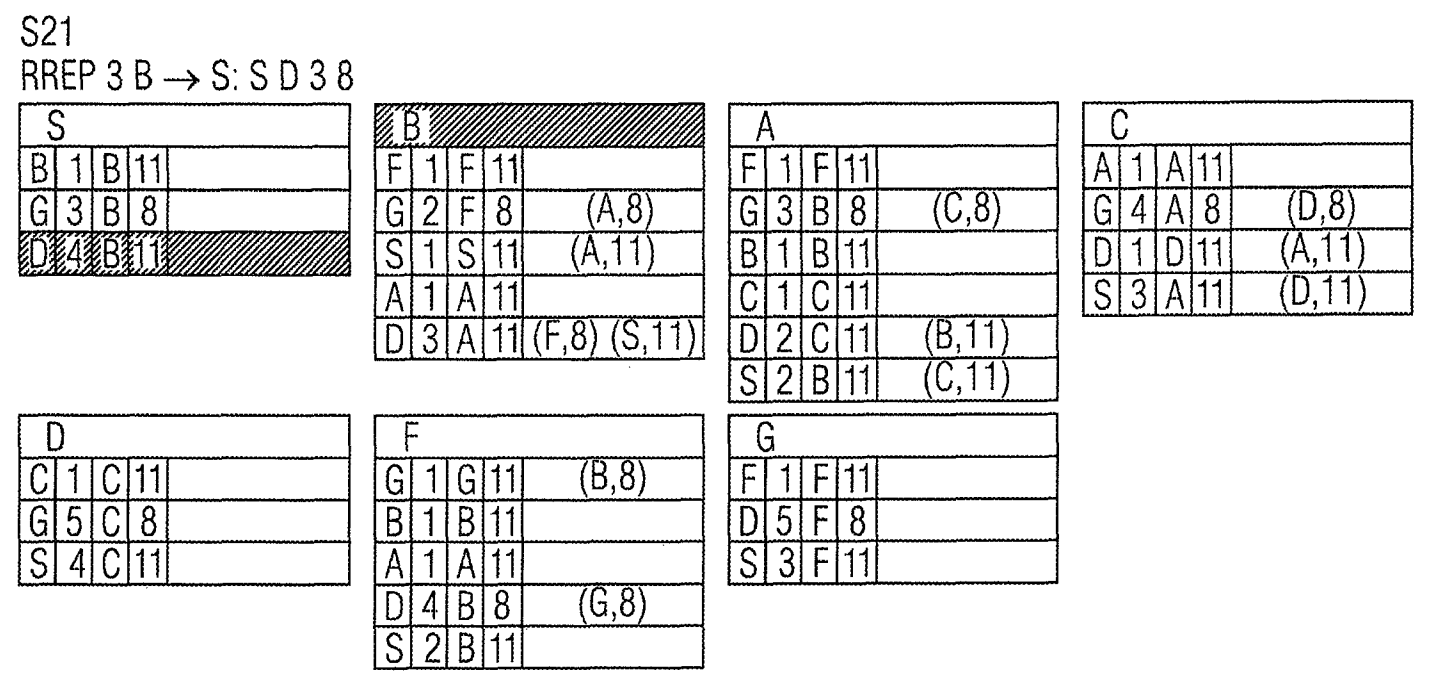

A procedure corresponding to that in FIGS. 3 and 4 is described in FIG. 5 in conjunction with FIG. 6, and in FIG. 7. In this case, however, a route request message has been broadcast from the network node S as source node, wherein network node D is specified as destination node. As evident from step 13 in FIG. 5, for example, the time point at which the lifetime of the routing table entries that are generated and updated with this route request message is different (time point 11 instead of time point 8). If the steps S18 to S21 are examined, it is also evident that the precursor list is supplemented by a further entry in many routing table entries (cf., e.g., step S20, routing table entry for network node D). In this case, step S21 in FIG. 7 shows the final routing tables of all network nodes of the exemplary data network as per FIG. 1. If, as described above with reference to FIG. 1, the network node A now incorrectly sends data that is intended for the network node D to the network node F instead of to the network node C, these data frames are discarded, thereby preventing the occurrence of data loops.

The consequence of the discussed embodiments of method in accordance with the invention are illustrated again with reference to the following exemplary embodiment. The following abbreviations are used in this case:
RA address of a receiving network node ("receiver address"),
TA address of the network node sending a data frame ("transmitter address"),
DA address of the destination node ("destination address"),
SA address from which the data frame was originally sent ("source address").

Examination of the network node A:
step 1: network node A receives a data frame in which RA=A, TA=B, DA=D, SA=G or S,
step 2: the network node A is not the destination of the data frame (A≠D), i.e. the address of the destination node does not correspond to the address of the network node, and
step 3: the data frame was correctly received, since the sending network node B is in the precursor list of the routing table entry for the destination node D ([D-2-C-11-(B,11)]).

It should be understood that it is further assumed that network node A is supposed to forward the data frame to C (routing table entry for the network node D is: [D-2-C-11-(B, 11)]). In fact, it is assumed that network node A incorrectly transfers the data frame to the network node F.

It is further assumed that network node A is supposed to forward the data frame to C (routing table entry for the network node D is: [D-2-C-11-(B,11)]). In fact, it is assumed that network node A incorrectly transfers the data frame to the network node F.

Examination of the Network Node F:

step 1: network node F receives a data frame in which RA=F, TA=A, DA=D, SA=G or S, step 2: the network node F is not the destination of the data frame (F≠D), step 3: the data frame was incorrectly received, since the sender (transmitter) B is not in the precursor list of the routing table entry for the network node D ([D-4-B-8-(G, 8)]). As a result of this, the data frame is discarded.

The contemplated embodiments of the method in accordance with the invention therefore prevent the formation of data loops if a faulty network node transfers a data frame back to the network node from which it was received.

It should also be understood, it is assumed that the network node B in FIG. 1 sends data frames which are intended for the network node D back to the network node S or F. Both S and F have valid paths to the destination node D, network node B being the next destination node, the next hop.

Examination of the network node B:

step 1: network node B receives a data frame in which RA=B, TA=S or F, DA=D, SA=S or G, step 2: the network node B is not the destination of the data frame (B≠D), and step 3: the data frame was correctly received, since the sender S or F is in the precursor list of the routing table entry for the network node D ([D-3-A-11-(F,8)(S,11)]).

The network node B would be configured to transfer the data frame to the network node A. This is evident from the routing table entry for network node: [D-3-A-11-(F,8)(S,11)]. However, it is assumed in the presently contemplated exemplary embodiment that the data frame is incorrectly transferred to the network node F or S.

Examination of the network node S:

step 1: network node S receives a data frame in which RA=S, TA=B, DA=D, SA=S or G, step 2: the network node S is not the destination of the data frame (S≠D), and step 3: the data frame was incorrectly received, since the sender B is not in the precursor list of the routing table entry for the network node D ([D-4-B-11-( )]). As a result of this, the data frame is discarded.

Examination of the network node F:

step 1: network node F receives a data frame in which RA=F, TA=B, DA=D, SA=S or G, step 2: the network node F is not the destination of the data frame (F≠D), and step 3: the data frame was incorrectly received, since the sender B is not in the precursor list of the routing table entry for the network node D ([D-4-B-8-(G,8)]).

The data frame is therefore discarded.

Figure 8:
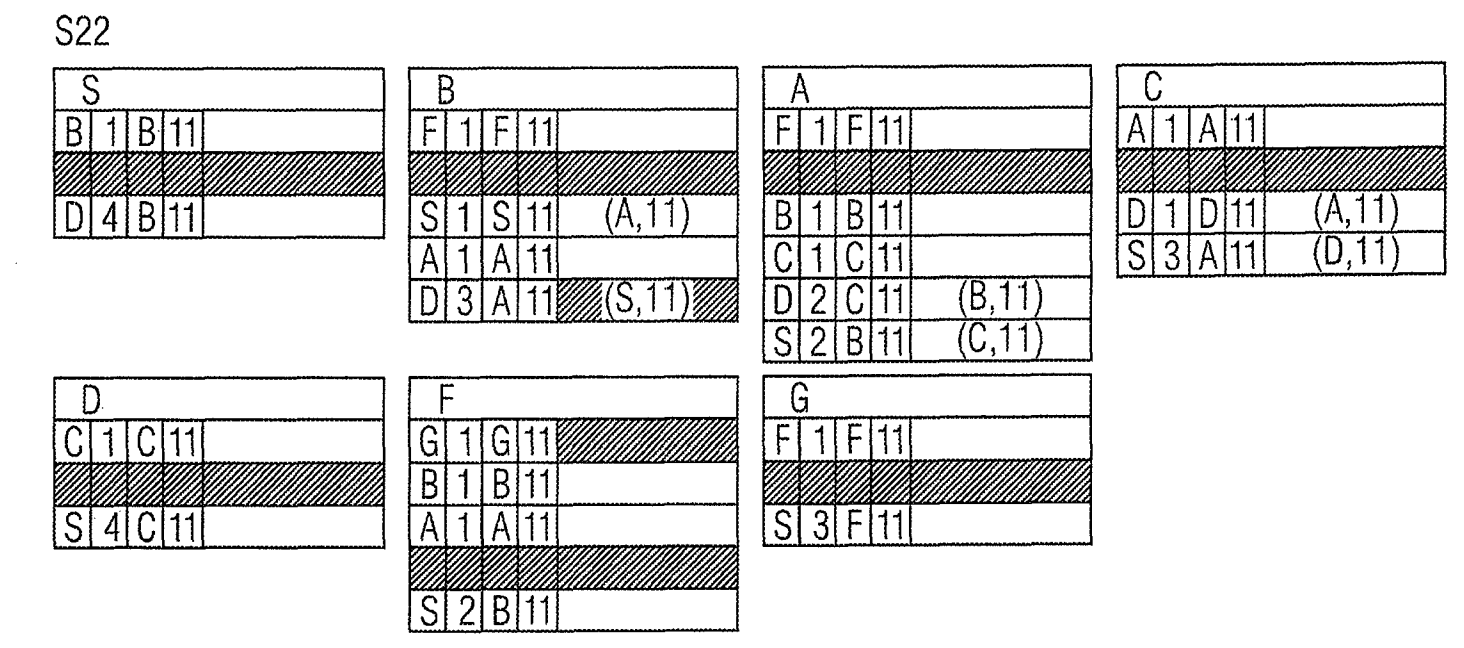

FIG. 8 also illustrates the continuous updating of the precursor lists of overlapping data paths. For example, it can be seen from the routing tables of the network nodes S, B, A, C, D, F and G that, due to the expiry of the lifetimes of routing table entries, the associated precursor list entries are deleted. This is represented by the highlighted empty table entries. When the lifetime of a routing table entry expires, both the routing table entry and the precursor list entry itself are deleted. Here, it is assumed in the exemplary embodiment that the data path between the network nodes G and D has expired. However, the data path to the destination node D does not expire in the network nodes B, A and C because there is still an active data path between the network nodes S and D. The network node B has precursors for its data path to D, specifically one for the data path between G and D and one for the data path between S and D. In this case, only the first of these expires and is deleted from the precursor list.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Document References:

[1] C. E. Perkins, E. M. Belding-Royer, S. R. Das: Ad hoc On-demand Distance Vector (AODV) Routing, IETF Experimental RFC 3561, July 2003.

What is claimed is:

1. A method for operating a wireless mesh data network comprising a plurality of network nodes (MN) including a source node (SN), at least one intermediate node (IN), and a destination node (DN), wherein data frames are transferred from the source node (SN) through the at least one intermediate node (IN) to the destination node (DN), the method comprising:

checking, during transfer of a data frame at least some of said plural network nodes (MN) which receive the data frame, with reference to a precursor list assigned to the destination node (DN) of the data frame and containing details of immediately adjacent network nodes, whether the network node (MN) sending the data frame is included in the precursor list;

transferring the data frame to a further network node (MN) if the network node (MN) sending the data frame is included in the precursor list; and discarding the data frame or performing an error recovery routine if the network node (MN) sending the data frame is not included in the precursor list;

wherein an entry in the precursor list comprises a Media Access Control (MAC) address or an IP address, and a lifetime of the entry; and wherein the entry in the precursor list is deleted when the lifetime of the entry has expired.

2. The method as claimed in claim 1, comprising creating a routing table (RT) for each of, the source node (SN), the destination node (DN) and the at least one intermediate node (IN), each routing table (RT) comprising at least one entry, and setting up the precursor list for each entry in the routing table (RT), the precursor list comprising immediately adjacent nodes which are configured to transfer the data frame to the destination node (DN) of the dataframe.

3. The method as claimed in claim 2, wherein creation of the routing table (RT) occurs during transfer of a route request which is initiated by the source node (SN) and transfer of a route reply that is initiated by the destination node (DN).

4. The method as claimed in claim 3, wherein creation or updating of the precursor list is performed during the route reply that is initiated by the destination node (DN).

5. The method as claimed in claim 4, wherein the creation of a precursor list for a routing table entry for the destination node is not necessary on any intermediate node which is adjacent to the source node (SN) in a data frame transfer route between the destination node (DN) and the source node (SN), or which is adjacent to the destination node (DN) in a data frame transfer route between the source node (SN) and the destination node (DN).

6. The method as claimed in claim 1, wherein the data frame comprises an address of the destination node (D), the address of a network node sending the data frame, the address of the network node receiving the data frame and optionally the address of the source node (S), and wherein the step of checking includes checking at the network node receiving the data frame to determine whether the address allocated to the network node receiving the data frame corresponds to the address of the destination node in the sent data frame and the step of transferring includes, if the address allocated to the network node receiving the data frame corresponds to the address of the destination node, supplying the data frame to a further unit for processing.

7. The method as claimed in claim 6, wherein the further unit comprises a higher layer in an Open Systems Interconnection (OSI) reference model.

8. The method as claimed in claim 1, wherein the lifetime of an entry in the precursor list of a network node is reset to an initial value when the network node receives the data frame from another network node having an address which corresponds to the MAC or IP address in the entry.

9. The method as claimed in claim 1, wherein the lifetime of the entry in the precursor list is maximally as long as a path lifetime value from the source node to the destination node, and wherein the path lifetime value is included as information in the routing table entry.

10. The method as claimed in claim 9, wherein the lifetime of an entry in the precursor list and the path lifetime value in a relevant routing table entry are updated simultaneously.

11. The method as claimed in claim 1, wherein another network node, which is not the source node (SN) or the destination node (DN) or one of said plural intermediate nodes (IN) on a data path between the source node (SN) and the destination node (DN), after receiving a route request of the source node, transfers a data frame to the source node through another intermediate node;
wherein the another intermediate node is a next network node on a reverse path to the source node, does not contain the another network node in the precursor list of the routing table entry for the source node (SN) and discards the data frame received from the another network node.

12. The method as claimed in claim 11, wherein the data path which is formed between the another network node and the source node is identified as invalid.

13. The method as claimed in claim 12, wherein a route discovery to the source node is performed by the another network node.

14. The method as claimed in claim 11, wherein the another network node is included in the precursor list of the routing table entry for the reverse path to the source node, at the another intermediate node, before the data frame is transferred from the another network node to the source node (SN).

15. The method as claimed in claim 14, wherein inclusion of the another network node in the precursor list of the routing table entry for the reverse path to the source node, at the another intermediate node, is effected by sending a route reply to the source node, specifying the another network node as the destination and the source node as a source.

16. The method as claimed in claim 11, wherein addresses of all network nodes adjacent to a network node are entered with an expiry value in the precursor list of this network node as a temporary entry when a route request is received.

17. The method as claimed in claim 16, wherein a network node which is adjacent to the network node, which has broadcast the route request, is not entered in the precursor list of this network node.

18. The method as claimed in claim 16, wherein the temporary entry in the precursor list is assigned an expiry value having same value as the reverse path that was established by the route request.

19. The method as claimed in claim 16, wherein temporary entries are deleted from the precursor list when an entry is created in the precursor list during the route reply that is initiated by the destination node.

\* \* \* \* \*